R. B. WILLIAMSON.
DYNAMO ELECTRIC MACHINE.
APPLICATION FILED MAY 17, 1912.

1,152,683.

Patented Sept. 7, 1915.

Witnesses
Rob. E. Stoll
Chas. L. Byron

Inventor
Robert B. Williamson.
By Chas. E. Lord
Attorney

UNITED STATES PATENT OFFICE.

ROBERT B. WILLIAMSON, OF MILWAUKEE, WISCONSIN, ASSIGNOR, BY MESNE ASSIGNMENTS, TO ALLIS-CHALMERS MANUFACTURING COMPANY, A CORPORATION OF DELAWARE.

DYNAMO-ELECTRIC MACHINE.

1,152,683.      Specification of Letters Patent.      Patented Sept. 7, 1915.

Application filed May 17, 1912. Serial No. 697,952.

*To all whom it may concern:*

Be it known that I, ROBERT B. WILLIAMSON, a citizen of the United States, residing at Milwaukee, in the county of Milwaukee and State of Wisconsin, have invented certain new and useful Improvements in Dynamo-Electric Machines, of which the following is a full, clear, and exact specification.

This invention relates to dynamo-electric machines, and particularly to those dynamo-electric machines wherein the stator core and its windings are removable from the machine frame as a unit.

In one class of split frame dynamo-electric machines, that type wherein a part of the frame may be removed and then the stator core with its windings removed as a unit, great care must be taken that the various parts of the stator, including the stator core and windings, be held in their relative fixed positions and be so protected to prevent damage to any of said parts.

It is, therefore, the object of my invention to prevent injury to the parts of a removable unit including a core with its windings having end-turns, and to retain said parts in a fixed position relatively to each other.

The invention is illustrated on the accompanying sheet of drawings, in which—

Figure 1:
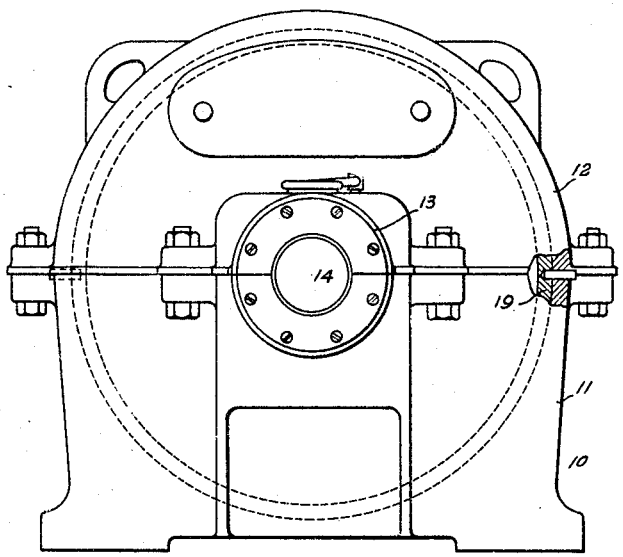
Figure 2:
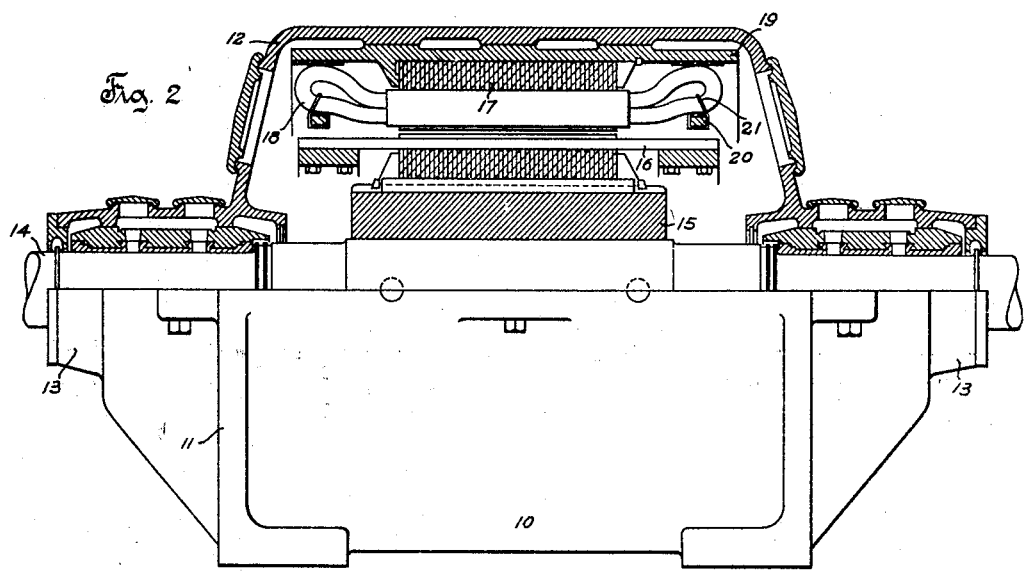

Figure 1 is an end elevation of a dynamo-electric machine equipped with my invention; and, Fig. 2 is a front elevation, parts being in section, of the same dynamo-electric machine.

The various novel features of this invention will appear from the description and drawings, and will be particularly set forth in the claims.

The various parts of dynamo-electric machines have to be so constructed and arranged relatively to each other that the parts will be properly supported and retained with respect to each other to prevent damage to any of said parts.

My invention is particularly applicable to a dynamo-electric machine such as the one here shown, having a frame 10 which is split or divided into two portions, a removable upper portion 12, and a lower portion 11 provided with bearing members 13 in which a shaft 14 carrying the rotating core 15 with its windings 16 is mounted. Surrounding the rotor is the stator including a core 17, preferably laminated and provided with a winding having end turns 18. This stator core is mounted and supported in an annular member or shell 19, which is adapted to be received by the lower portion 11 of the split frame 10, and which is adapted to be covered by the upper portion 12 of said frame, this annular member 19 being supported and held in position by the frame when the machine is in assembled condition. The shell 19, which surrounds the stator core and its windings, is made sufficiently long so that the end-turns 18 of the stator winding are located completely within said shell. The stator end-turns 18 are interposed between the shell 19 and retaining members 20, which are preferably annular retaining members in the form of insulated steel rings which exert pressure against the end-turns 18 of the stator windings when said rings are forced into the position shown, to hold said end-turns in a fixed position. These retaining rings 20 are bound to the end-turns by any proper means such as cord or lacing 21. With this arrangement, the stator end-turns are held in fixed positions. Proper insulation is provided between the shell 19 and end-turns 18, and also between the retaining rings 20 and end-turns 18.

With this construction, if it is desired to remove the stator for any reason, the upper portion 12 of the split frame may be removed first, then the rotor and stator removed as a unit, the rotor next being removed from within the stator. The stator will then appear as a mere barrel or annular shell having within it a core provided with a winding. This shell may be turned up on end or handled in any other way without injury to the various parts of the core and its winding. In view of the fact that the end-turns 18 of the winding are completely within the annular shell, said end-turns cannot be injured in any manner whatsoever. The end-turns are held against said shell by the retaining rings 20 under all conditions whether during operation or not.

There may be various modifications and arrangements other than that here shown and described, and it is my intention to cover all such modifications and arrangements which do not involve a departure from the spirit and scope of my invention as set forth in the appended claims.

What I claim as new is:

1. In a dynamo-electric machine, the combination of a frame, a removable shell within said frame and supported thereby, a core mounted in said shell, and a winding carried by said core and provided with end turns extending beyond said core, said shell extending beyond said end-turns.

2. In a dynamo-electric machine, the combination of a frame, a shell within said frame and removable therefrom, a core mounted in said shell, a winding carried by said core and having end-turns projecting beyond said core, said shell extending beyond said end-turns, and means for holding said end-turns against said shell.

3. In a dynamo-electric machine having a split frame, an annular member mounted in said frame, a stator core supported in said annular member, a winding having end-turns and carried thereby, said annular member extending beyond said end-turns, and means for holding said end-turns in a fixed position.

4. In a dynamo-electric machine, the combination of a removable unit including a shell, a core mounted in said shell, windings having end-turns and carried by said core, said shell extending beyond said end-turns, and retaining members located radially inward from said end-turns and being adapted to hold said end-turns in a fixed position with respect to said shell.

5. In a dynamo-electric machine having a split frame, a removable unit located in said frame and including an annular member, a core mounted in said annular member, a winding having end-turns and carried by said core, and retaining rings for retaining said end-turns in engagement with said annular member, said end-turns being interposed between said retaining means and annular member.

6. In a dynamo-electric machine, the combination of a frame, a removable shell within said frame and supported thereby, a core mounted in said shell, a winding carried by said core and provided with end-turns, and means for holding said end-turns in fixed position relatively to said shell and independently of said frame.

7. In a dynamo-electric machine, the combination of a field frame, an annular shell supported and held in position by said frame, a core supported by said shell, and a winding having projecting end-turns and carried by said core, said shell extending in an axial direction beyond said projecting end turns.

8. In a dynamo-electric machine, the combination of a frame, an annular shell supported by and held in position within said frame, a core supported by said shell, and a winding having projecting end-turns and carried by said core, portions of said shell extending in an axial direction beyond said projecting end-turns.

In testimony whereof I affix my signature, in the presence of two witnesses.

ROBERT B. WILLIAMSON.

Witnesses:
   Chas. L. Byron,
   Rob. E. Stoll.

Copies of this patent may be obtained for five cents each, by addressing the "Commissioner of Patents, Washington, D. C."